United States Patent
Farooq et al.

(10) Patent No.: US 11,491,950 B2
(45) Date of Patent: Nov. 8, 2022

(54) VEHICLE EXTERNAL AIRBAG

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 149 days.

(21) Appl. No.: 17/188,229

(22) Filed: Mar. 1, 2021

(65) Prior Publication Data

US 2022/0274558 A1    Sep. 1, 2022

(51) Int. Cl.
| | |
|---|---|
| *B60R 21/36* | (2011.01) |
| *B60R 21/2338* | (2011.01) |
| *B60R 21/0134* | (2006.01) |
| *B60R 21/34* | (2011.01) |

(52) U.S. Cl.
CPC .......... *B60R 21/36* (2013.01); *B60R 21/0134* (2013.01); *B60R 2021/23386* (2013.01); *B60R 2021/346* (2013.01)

(58) Field of Classification Search
CPC ..... B60R 21/2338; B60R 21/34; B60R 21/36; B60R 2021/23386; B60R 2021/23388; B60R 2021/346
See application file for complete search history.

(56) References Cited

U.S. PATENT DOCUMENTS

| | | | | |
|---|---|---|---|---|
| 6,637,788 | B1* | 10/2003 | Zollner | B60R 21/36 280/728.1 |
| 6,733,035 | B2* | 5/2004 | Thomas | B60R 21/232 280/730.2 |
| 6,920,954 | B2* | 7/2005 | Hashimoto | B60R 21/2155 180/274 |
| 7,000,725 | B2 | 2/2006 | Sato et al. | |
| 7,073,619 | B2* | 7/2006 | Alexander | B60R 21/36 180/274 |
| 7,630,806 | B2* | 12/2009 | Breed | B60R 21/0134 701/45 |
| 7,836,996 | B2* | 11/2010 | Kitte | B60R 21/36 180/274 |

(Continued)

FOREIGN PATENT DOCUMENTS

| | | |
|---|---|---|
| DE | 10059205 A1 | 7/2002 |
| DE | 10251279 A1 | 5/2004 |

(Continued)

*Primary Examiner* — Barry Gooden, Jr.
(74) *Attorney, Agent, or Firm* — Frank A. MacKenzie; Bejin Bieneman PLC

(57) ABSTRACT

A vehicle includes a body. The body includes a front pillar and a front-end structure spaced from the front pillar. The front-end structure includes a grille. The body includes a hood extending from the front pillar to the front-end structure. An airbag is mounted to the front-end structure adjacent to the grille and is inflatable to an inflated position. The airbag includes an upper portion inflatable along the front-end structure and the hood to the inflated position. A pyrotechnic actuator is disposed at the front pillar. The pyrotechnic actuator is positioned to pull the upper portion across the hood towards the front pillar during inflation.

20 Claims, 5 Drawing Sheets

(56) References Cited

U.S. PATENT DOCUMENTS

| | | | |
|---|---|---|---|
| 8,016,066 B1* | 9/2011 | Boxey | B60R 21/36 180/274 |
| 8,727,061 B2* | 5/2014 | Rydsmo | B60R 21/36 180/274 |
| 9,150,175 B1* | 10/2015 | Farooq | B60R 21/36 |
| 10,953,844 B2* | 3/2021 | Farooq | B60R 21/36 |
| 2002/0070537 A1* | 6/2002 | Webber | B60R 21/232 280/730.2 |
| 2004/0074688 A1* | 4/2004 | Hashimoto | B60R 21/2155 180/274 |
| 2004/0074690 A1* | 4/2004 | Sato | B60R 21/2338 180/274 |
| 2004/0100073 A1* | 5/2004 | Bakhsh | B60R 21/213 280/730.2 |
| 2004/0169362 A1* | 9/2004 | Hammer | B60R 21/36 280/751 |
| 2004/0262894 A1 | 12/2004 | Kempf | |
| 2005/0140174 A1* | 6/2005 | Fayt | B62D 25/16 296/187.04 |
| 2005/0230940 A1* | 10/2005 | Alexander | B60R 21/36 280/730.1 |
| 2005/0269805 A1* | 12/2005 | Kalliske | B60R 21/36 180/274 |
| 2009/0102167 A1* | 4/2009 | Kitte | B60R 21/2338 280/743.2 |
| 2009/0152041 A1* | 6/2009 | Kim | B60R 21/36 180/274 |
| 2009/0242308 A1* | 10/2009 | Kitte | B60R 21/36 180/271 |
| 2009/0289471 A1* | 11/2009 | Finney | B60R 19/40 296/187.04 |
| 2010/0252350 A1* | 10/2010 | Hayashi | B60R 21/36 180/274 |
| 2014/0332304 A1* | 11/2014 | Thomas | B60R 21/36 180/274 |
| 2014/0332305 A1* | 11/2014 | Thomas | B60K 28/10 180/274 |
| 2016/0288764 A1* | 10/2016 | Suzuki | B60R 21/36 |
| 2016/0355152 A1* | 12/2016 | Perez Garcia | B60R 21/34 |
| 2017/0217400 A1* | 8/2017 | Battermann | B60R 21/36 |
| 2019/0001919 A1* | 1/2019 | Farooq | B60R 21/36 |
| 2019/0366971 A1* | 12/2019 | Nakamura | B60R 21/36 |
| 2020/0377053 A1* | 12/2020 | Umezawa | B60R 21/36 |
| 2021/0402952 A1* | 12/2021 | Nakamura | B60R 21/36 |

FOREIGN PATENT DOCUMENTS

| | | | |
|---|---|---|---|
| DE | 10356572 A2 | 6/2005 | |
| GB | 2564968 A * | 1/2019 | ........... B60R 19/205 |
| JP | 09164906 A * | 6/1997 | ............ B60R 21/36 |
| JP | 2000168473 A * | 6/2000 | ............ B60R 21/36 |
| JP | 2003182485 A * | 7/2003 | ............ B60R 21/36 |
| JP | 2009096276 A * | 5/2009 | ............ B60R 21/36 |
| JP | 2011189924 A * | 9/2011 | ............ B60L 50/20 |

* cited by examiner

VEHICLE EXTERNAL AIRBAG

BACKGROUND

A vehicle may include one or more airbags deployable during a vehicle impact. The airbag may be a component of an airbag assembly including a housing supporting the airbag, and an inflation device in communication with the airbag for inflating the airbag from an uninflated position to an inflated position.

DETAILED DESCRIPTION

Figure 1:
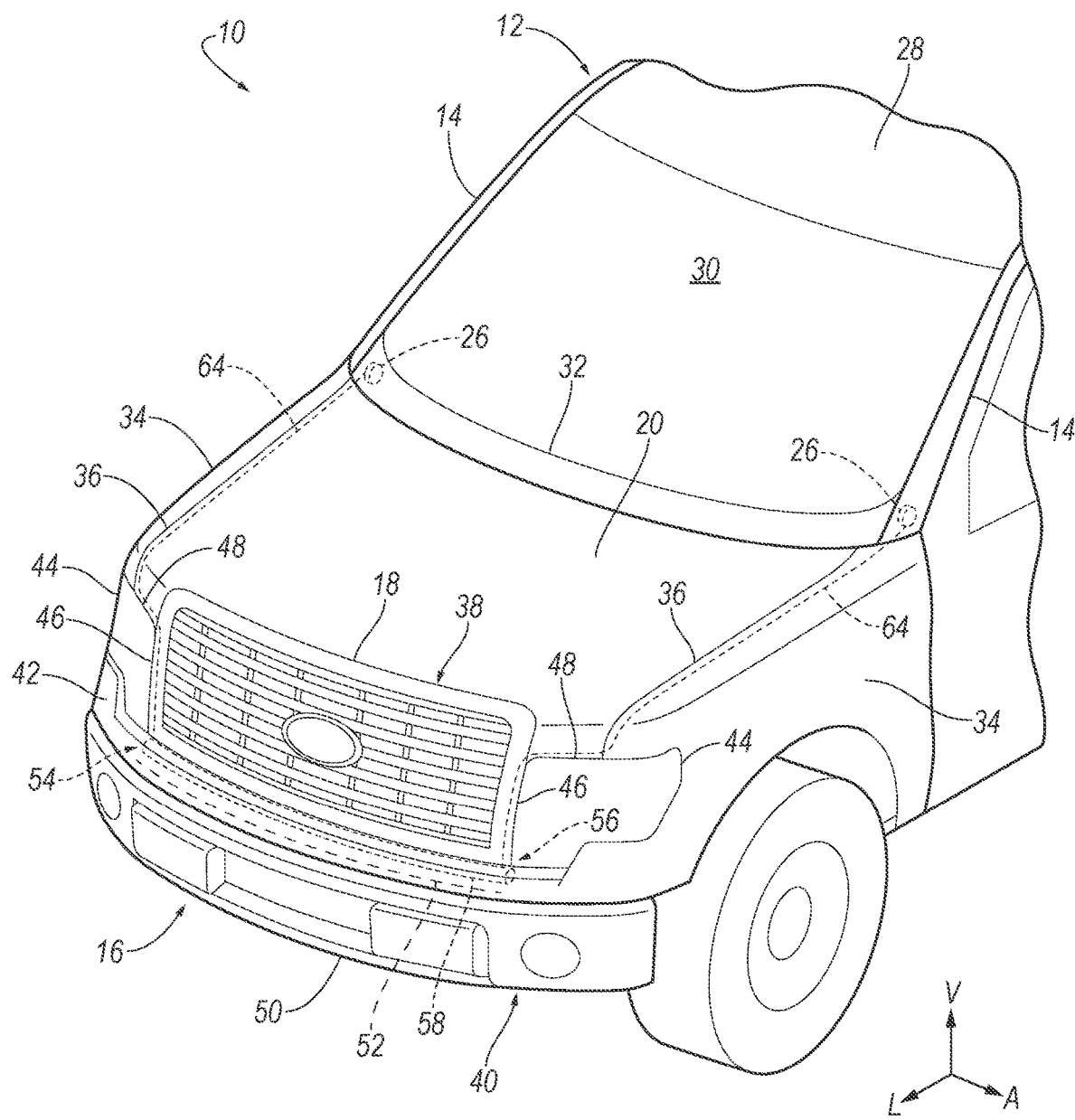
FIG. 1 is a perspective view of a vehicle including an airbag in an uninflated position.

A vehicle includes a body. The body includes a front pillar and a front-end structure spaced from the front pillar. The front-end structure includes a grille. The body includes a hood extending from the front pillar to the front-end structure. An airbag is mounted to the front-end structure adjacent to the grille and is inflatable to an inflated position. The airbag includes an upper portion inflatable along the front-end structure and the hood to the inflated position. A pyrotechnic actuator is disposed at the front pillar. The pyrotechnic actuator is positioned to pull the upper portion across the hood towards the front pillar during inflation.

The pyrotechnic actuator may include a tether extending along the hood to the upper portion of the airbag. The tether may be connected to the upper portion.

The body may include a fender extending alongside the hood between the front-end structure and the front pillar. The tether may be disposed between the hood and the fender when the airbag is in an uninflated position.

The upper portion may extend upwardly above the grille in the inflated position.

The front-end structure may include a bumper disposed below the grille. The airbag may include a lower portion extending downwardly below the bumper in the inflated position.

The airbag may be disposed between the grille and the bumper in an uninflated position.

The front-end structure may include a trim panel disposed between the grille and the bumper. The trim panel may cover the airbag in an uninflated position.

The upper portion may extend to the front pillar in the inflated position.

The upper portion may cover the hood in the inflated position.

The vehicle may include a sensor and a computer in communication with the sensor. The computer may have a processor and a memory storing instructions executable by the processor to initiate inflation of the airbag and actuation of the pyrotechnic actuators based on the sensor detecting a pre-impact.

The instructions may further include instructions to initiate inflation of the airbag prior to actuating the pyrotechnic actuators.

An external airbag system includes a trim panel configured to be disposed adjacent to a grille. An airbag is supported by the trim panel and is inflatable to an inflated position. The airbag includes an upper portion configured to inflate along a hood of a vehicle during inflation. A pyrotechnic actuator is spaced from the trim panel. The pyrotechnic actuator is configured to pull the upper portion across the hood towards a front pillar during inflation.

The upper portion may extend upwardly from the trim panel in the inflated position.

The airbag may include a lower portion extending downwardly from the trim panel in the inflated position.

The trim panel may be configured to be disposed below the grille.

The upper portion may be configured to cover the hood in the inflated position.

The upper portion may be configured to extend to the front pillar in the inflated position.

The pyrotechnic actuator may include a tether configured to extend along the hood to the upper portion of the airbag. The tether may be connected to the upper portion.

The external airbag system may include a sensor and a computer in communication with the sensor. The computer may have a processor and a memory storing instructions executable by the processor to initiate inflation of the airbag and actuation of the pyrotechnic actuators based on the sensor detecting a pre-impact.

The instructions may further include instructions to initiate inflation of the airbag prior to actuating the pyrotechnic actuators.

With reference to the Figures, wherein like numerals indicate like parts throughout the several views, a vehicle 10 is generally shown. The vehicle 10 includes a body 12. The body 12 includes a front pillar 14 and a front-end structure 16 spaced from the front pillar 14. The front-end structure 16 includes a grille 18. The body 12 includes a hood 20 extending from the front pillar 14 to the front-end structure 16. An airbag 22 is mounted to the front-end structure 16 adjacent to the grille 18. The airbag 22 is inflatable to an inflated position. The airbag 22 includes an upper portion 24 inflatable along the front-end structure 16 and the hood 20 to the inflated position. A pyrotechnic actuator 26 is disposed at the front pillar 14. The pyrotechnic actuator 26 is positioned to pull the upper portion 24 across the hood 20 towards the front pillar 14 during inflation.

The vehicle 10 may include sensors 72 programmed to detect a pre-impact, as discussed below. Upon detecting the pre-impact, the airbag 22 may be inflated from an uninflated position to the inflated position. Additionally, the pyrotechnic actuator 26 may be actuated to pull the upper portion 24 of the airbag 22 across the hood 20. During a vehicle impact, a pedestrian impacted by the vehicle 10 may be forced into the airbag 22. During the vehicle impact, the airbag 22 may provide coverage so as to control the kinematics of the object. Specifically, by pulling the upper portion 24 across the hood 20, the pyrotechnic actuator 26 positions the upper portion to increase coverage of the airbag 22 across the hood 20 to control the kinematics of the pedestrian in the event the pedestrian is urged toward the hood 20.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 defines a vehicle-longitudinal axis L extending between a front (not numbered) and a rear (not numbered) of the vehicle 10. The vehicle 10 defines a vehicle-lateral axis A extending from one side to the other side of the vehicle 10. The vehicle 10 defines a vertical axis V extending between a top (not numbered) and a bottom (not numbered) of the vehicle 10. The vehicle-longitudinal axis L, the vehicle-lateral axis A, and the vertical axis V are perpendicular relative to each other.

With continued reference to FIG. 1, the vehicle 10 may include a body 12 defining a passenger cabin (not numbered) to house occupants, if any, of the vehicle 10. The body 12 may include a roof 28 and the floor (not shown) with the roof 28 defining an upper boundary of the passenger cabin and the floor defining a lower boundary of the passenger cabin. The body 12 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats (not shown).

The body includes two front pillars 14 extending downwardly from the roof 28, i.e., generally towards the floor. The front pillars 14 may be spaced from each other along the vehicle-lateral axis A. In other words, one front pillar 14 may be disposed on one side of the vehicle 10, and the other front pillar 14 may be disposed on the other side of the vehicle 10. The front pillars 14 may be disposed at the front of the passenger cabin. The front pillars 14 may be referred to as "A-pillars."

With continued reference to FIG. 1, the vehicle 10 may include a windshield 30 extending from one side of the vehicle 10 to the other side of the vehicle 10. In other words, the windshield 30 may extend from one front pillar 14 to the other front pillar 14. The windshield 30 may extend from the roof 28 along the front pillars 14, i.e., towards the floor. The windshield 30 may be any suitably durable transparent material, including glass such as laminated, tempered glass or plastic such as Plexiglas® or polycarbonate.

With continued reference to FIG. 1, the body 12 may include a cowl 32 external to the passenger cabin. The cowl 32 may extend along the vehicle-longitudinal axis L from the windshield 30 the hood 20. The cowl 32 may extend along the vehicle-lateral axis A from one side of the vehicle 10 to the other side of the vehicle 10 along the windshield 30, i.e., from one front pillar 14 to the other front pillar 14. The cowl 32 may be a class-A surface, i.e., a surface specifically manufactured to have a high-quality, finished aesthetic appearance free of blemishes.

The body 12 may include fenders 34 elongated along the vehicle-longitudinal axis L. The fenders 34 may be spaced from each other along the vehicle-lateral axis A. In other words, one fender 34 may be disposed on one side of the vehicle 10 and the other fender 34 may be disposed on the other side of the vehicle 10. The fenders 34 may be disposed adjacent to the front pillars 14. Specifically, one fender 34 may be adjacent one front pillar 14 and the other fender 34 may be adjacent the other front pillar 14. The fenders 34 may extend alongside the hood 20 from between the front-end structure 16 and the front pillars 14. The fenders 34 may be supported by rails (not shown), which may be referred to as fender support rails and/or shotgun rails. The rails may be spaced from each other along the vehicle-lateral axis A and may extend from the front pillars 14 along the vehicle-longitudinal axis L. For example, the fenders 34 may be fixed to the rails, e.g., via fasteners, welding, etc.

With continued reference to FIG. 1, the hood 20 may extend along the vehicle-longitudinal axis L from the cowl 32 to the front-end structure 16, i.e., along the fenders 34. Additionally, the hood 20 may extend from one side of the vehicle 10 to the other side of the vehicle 10, e.g., from one fender 34 to the other fender 34. The hood 20 may be hinged at the front pillars 14. That is, the hood 20 may extend along the cowl 32 from one front pillar 14 to the other front pillar 14.

The hood 20 and the fenders 34 may define first gaps 36 therebetween. The first gaps 36 may be spaced from each other along the vehicle-lateral axis A. Specifically, one first gap 36 is between the hood 20 and one fender 34, and the other first gap 36 is between the hood 20 and the other fender 34. The first gaps 36 may be elongated along the vehicle-longitudinal axis L, e.g., from the cowl 32 to the front-end structure 16. In other words, the longest dimension of the first gaps 36 may be along the vehicle-longitudinal axis L.

The front-end structure 16 is spaced from the cowl 32 along the vehicle-longitudinal axis L. The front-end structure 16 extends downwardly along the vertical axis V from the hood 20. The hood 20 may, for example, be selectively releasable from the front-end structure 16. For example, the hood 20 may be latched to the front-end structure 16. Additionally, the front-end structure 16 extends from one side of the vehicle 10 to the other side of the vehicle 10, i.e., from one fender 34 to the other fender 34. The front-end structure 16 may be fixed to the fenders 34, e.g., via fasteners.

The front-end structure 16 includes a grille assembly 38, a bumper assembly 40, and a trim panel 42. The grille assembly 38 may be spaced from the bumper assembly 40. For example, the trim panel 42 may be disposed between the grille assembly 38 and the bumper assembly 40. The grille assembly 38 is disposed above the bumper assembly 40 relative to the vertical axis V.

The grille assembly 38 may be supported by the body 12. For example, the grille assembly 38 may be supported by the rails. The grille assembly 38 may be elongated along the vehicle-lateral axis A, e.g., from one rail to the other rail.

The grille assembly 38 may include a grille reinforcement (not shown) and the grille 18. The grille reinforcement supports the grille 18 on the body 12, e.g., on the rails. The grille reinforcement may be attached to the rails in any suitable way, e.g., fasteners, welding, etc. The grille 18 may be supported by the grille reinforcement. The grille 18 may extend over, i.e., may cover, the grille reinforcement. The grille 18 may be fixed relative to the grille reinforcement. In other words, the grille 18 and the grille reinforcement move together as a unit.

The grille 18 may be a class-A surface, i.e., a surface specifically manufactured to have a high-quality, finished aesthetic appearance free of blemishes. The grille 18 may be of any suitable material, including plastic, metal, such as aluminum or steel; or any other suitable material.

Figure 2:
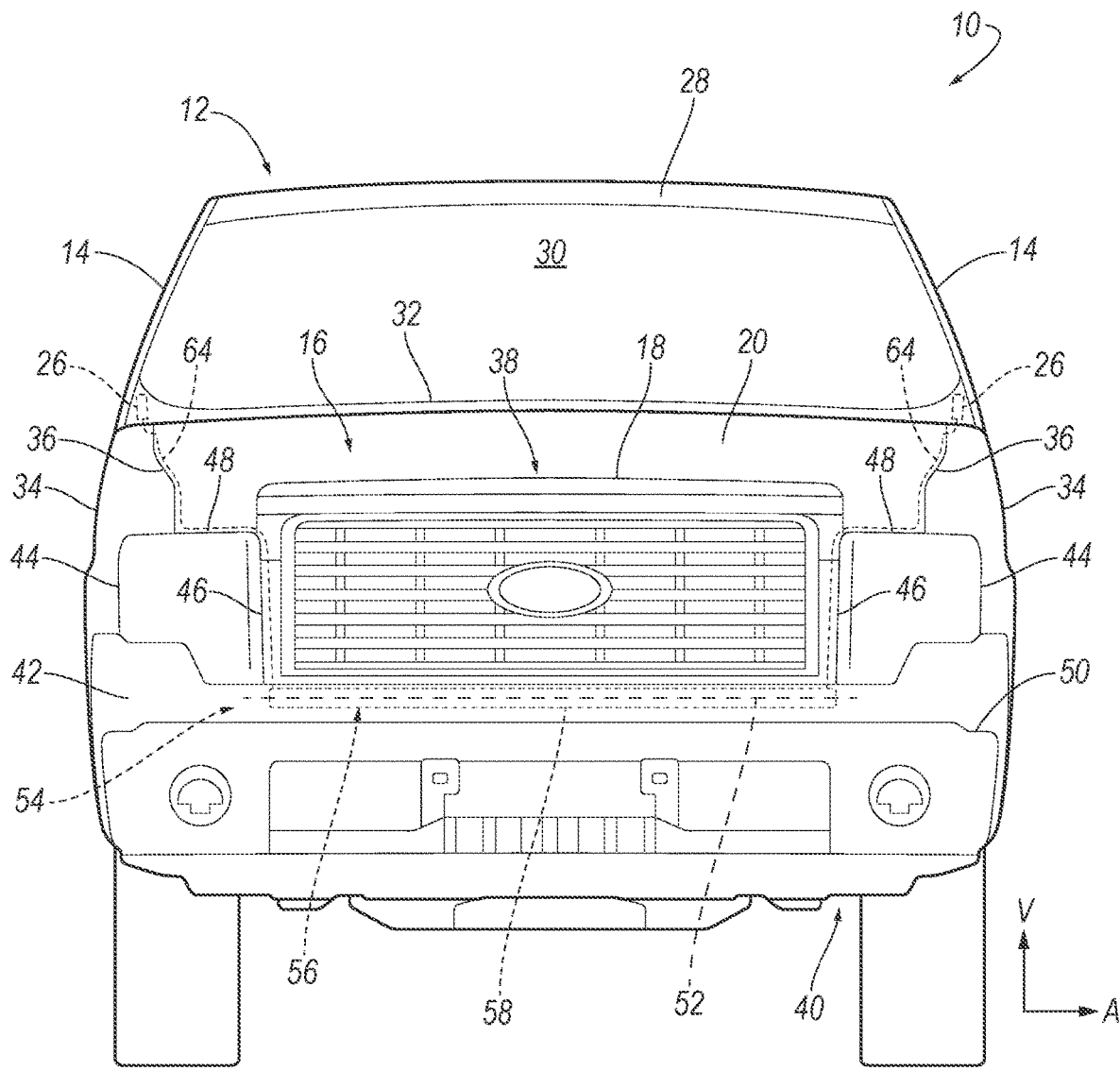
FIG. 2 is a front view of the vehicle in FIG. 1.

With reference to FIG. 2, the front-end structure 16 may include headlamps 44 spaced from each other along the vehicle-lateral axis A. The headlamps 44 may be disposed on opposite sides of the grille 18. That is, the grille 18 may be disposed between the headlamps 44. The headlamps 44 may define second gaps 46 with the grille 18. For example, one second gap 46 may be disposed between one headlamp 44 and the grille 18, and the other second gap 46 may be disposed between the other headlamp 44 and the grille 18. That is, the second gaps 46 may be spaced from each other along the vehicle-lateral axis A, i.e., each second gap 46 may be on one respective side of the grille 18. The second gaps 46 may, for example, extend from the trim panel 42 to the hood 20, e.g., along the vertical axis V.

Additionally, the headlamps 44 may define third gaps 48 with the hood 20. For example, one third gap 48 may be disposed between one headlamp 44 and the hood 20, and the other third gap 48 may be disposed between the other headlamp 44 and the hood 20. That is, the third gaps 48 may be spaced from each other along the vehicle-lateral axis A. Each third gap 48 may extend from one respective second gap 46 to one respective first gap 36, e.g., along the vehicle-lateral axis A.

As set forth above, the front-end structure 16 includes the bumper assembly 40. The bumper assembly 40 includes a bumper beam (not shown) and the bumper 50 supported on the bumper beam. The bumper beam may be elongated along the vehicle-lateral axis A, e.g., from one rail to the other rail. The bumper beam may be supported by the body 12. For example, the bumper beam may be fixed directly to the rails and by any suitable way including fasteners, welding, etc. As another example, the bumper beam may be fixed indirectly to the rails via one or more intermediate components. The bumper beam may be of any suitable material such as metal (steel, aluminum, etc.), fiber-reinforced plastic, etc.

The bumper 50 is supported by the bumper beam. For example, the bumper 50 may be affixed to the bumper beam and/or to the body 12 in any suitable manner, e.g., fasteners. The bumper 50 may be elongated along the vehicle-lateral axis A and cover the bumper beam. The bumper 50 may be a class-A surface, i.e., a surface specifically manufactured to have a high-quality, finished aesthetic appearance free of blemishes. The bumper 50 may be any suitable material, e.g., plastic.

As set forth above, the trim panel 42 is disposed between the grille assembly 38 and the bumper assembly 40. The trim panel 42 may, for example, extend from the bumper 50 to the grille 18, as shown in FIG. 2. The trim panel 42 may be fixed directly to the body 12, e.g., via fasteners. Alternatively, the trim panel 42 may be fixed indirectly to the body 12 via one or more intermediate components, e.g., the grille 18 and/or the bumper 50. For example, the trim panel 42 may be fixed to at least one of the grille 18 and the bumper 50. The trim panel 42 may include a class-A surface, i.e., i.e., a surface specifically manufactured to have a high quality, finished aesthetic appearance free of blemishes. The trim panel 42 may be, for example, plastic.

With reference to FIG. 2, the trim panel 42 may include a tear seam 52. For example, the tear seam 52 may extend along the vehicle-lateral axis A. The tear seam 52 may, for example, be disposed adjacent to the airbag 22. Said differently, the airbag 22 may extend through the tear seam 52 in the inflated position. The tear seam 52 may have any suitable shape. For example, the tear seam 52 may have a linear shape, i.e., extending in a line along the trim panel 42.

The tear seam 52 may be designed to tear apart when subjected to a tensile force above a threshold magnitude. In other words, the trim panel 42 on one side of the tear seam 52 separates from the trim panel 42 on the other side of the tear seam 52 when the force is above the threshold magnitude. The threshold magnitude may be chosen to be greater than forces from, e.g., inadvertent pushing against the trim panel 42 by an occupant but be less than forces from the deployment of the airbag 22. The tear seam 52 may be, for example, a line of perforations through the trim panel 42, a line of thinner trim panel 42 material than the rest of the trim panel 42, etc.

Returning to FIG. 1, the vehicle 10 includes an external airbag system 54. The external airbag system 54 includes pyrotechnic actuators 26 and an airbag assembly 56, which includes the airbag 22, a housing 58, and an inflator 60. The front-end structure 16 supports the airbag assembly 56, and specifically, may support the airbag 22 when the airbag 22 is in the inflated position. The airbag assembly 56 may be mounted to the front-end structure 16, as set forth below. The external airbag system 54 may include any suitable number of airbag assemblies 56. For example, the external airbag system 54 may include two airbag assemblies 56, e.g., one airbag assembly 54 for the front of the vehicle 10 and another airbag assembly 54 for the rear of the vehicle 10.

The housing 58 houses the airbag 22 in the uninflated position, as shown in FIG. 2, and supports the airbag 22 in the inflated position. The airbag 22 may be rolled and/or folded to fit within the housing 58 in the uninflated position. The housing 58 may be of any suitable material, e.g., a rigid polymer, a metal, a composite, or a combination of rigid materials. The housing 58 may, for example, include clips, panels, etc. for attaching the airbag 22 and for attaching the airbag assembly 56 to the trim panel 42.

The airbag 22 is supported by the front-end structure 16, as shown in FIG. 1. As set forth above, the airbag 22 is mounted to the front-end structure 16 adjacent to the grille 18. That is, the airbag 22 is mounted to a component of the front-end structure 16 such that no other vehicle components are between the grille 18 and the airbag 22 in the uninflated position. For example, the airbag assembly 56 may be fixed to the trim panel 42. The trim panel 42 may cover the airbag 22 in the uninflated position. As another example, the airbag assembly 56 may be fixed to the grille assembly 38, the bumper assembly 40, etc.

The airbag 22 may be formed of any suitable airbag material, for example, a woven polymer. For example, the airbag 22 may be formed of woven nylon yarn, for example, nylon 6-6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 22 may be a single continuous unit, e.g., a single piece of fabric. Alternatively, the airbag 22 may include a plurality of segments, i.e., two or more. The segments may be attached to each other in any suitable fashion, e.g., a plurality of panels attached by stitching, ultrasonic welding, etc.

Figure 3A:
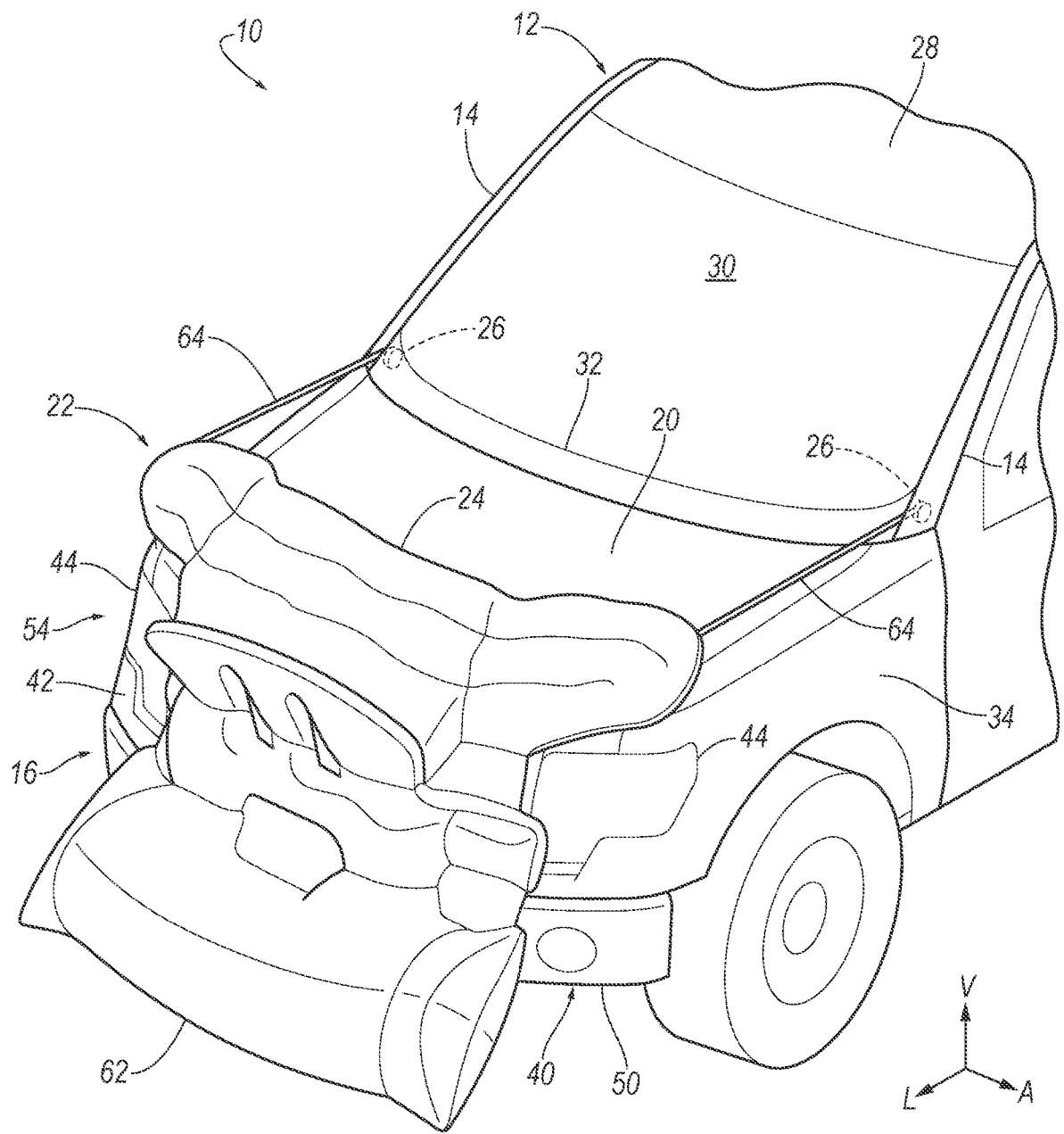
FIG. 3A is a perspective view of the vehicle including the airbag in a partially inflated position.
Figure 3B:
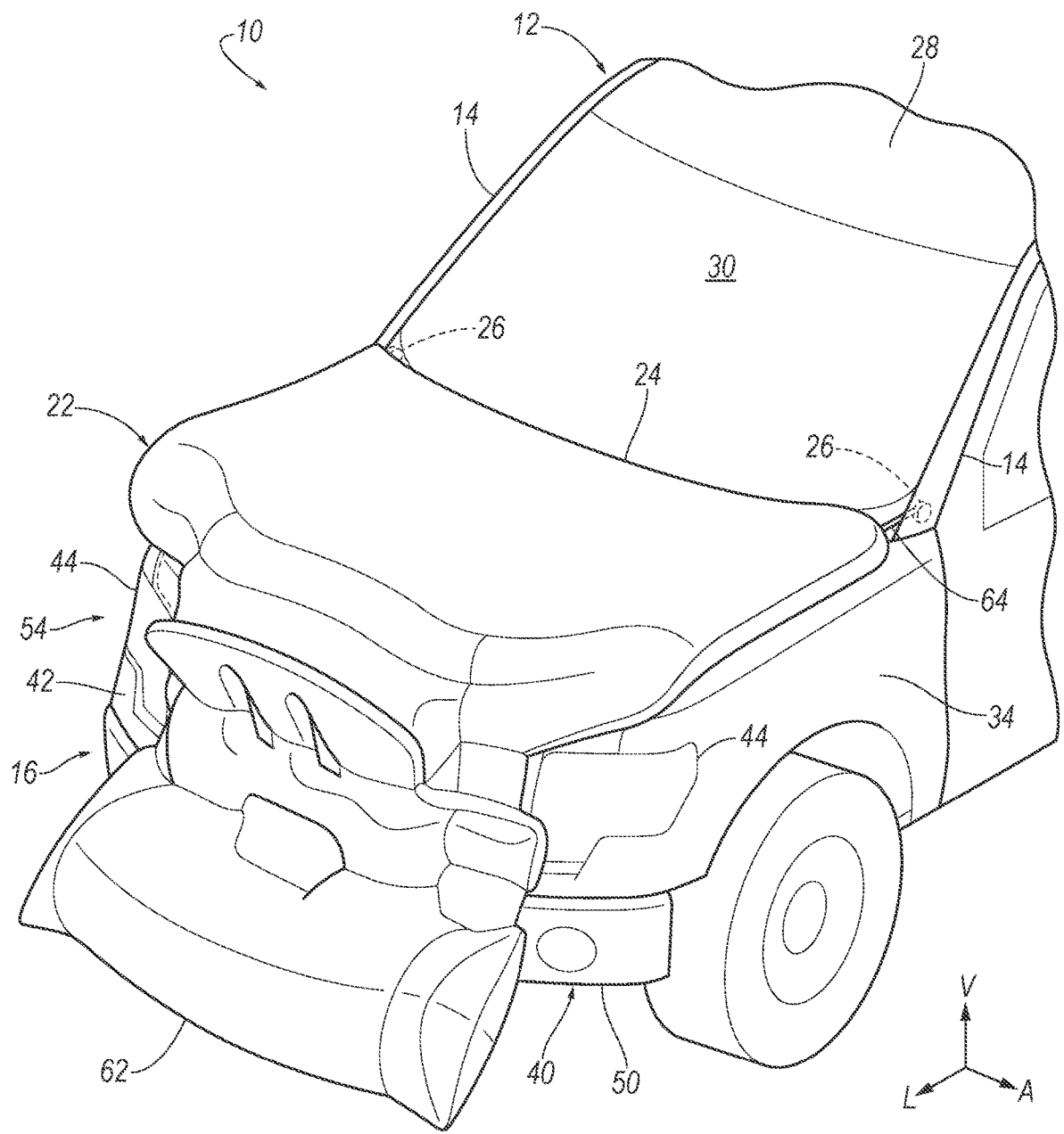
FIG. 3B is a perspective view of the vehicle including the airbag in an inflated position.

The airbag 22 is inflatable from an uninflated position, as shown in FIGS. 1 and 2, to an inflated position, as shown in FIG. 3B. In the uninflated position, the airbag 22 is disposed between the grille 18 and the bumper 50, as shown in FIG. 2. The airbag 22 may, for example, be elongated along the vehicle-lateral axis A in the uninflated position. In other words, the longest dimension of the airbag 22 in the uninflated position may be along the vehicle-lateral axis A. The airbag 22 may, for example, be rolled about the vehicle-lateral axis A in the uninflated position. That is, the airbag 22 may be rolled into a roll extending along the vehicle-lateral axis A.

The inflated position may be the position of the airbag 22 at the end of inflation by the inflator 60, i.e., just before the inflator 60 is exhausted. The airbag 22 is external to the passenger cabin in the inflated position. In the inflated position, the airbag 22 extends upwardly, i.e., along the vertical axis V, from the trim panel 42, as shown in FIG. 3B. Additionally, in the inflated position, the airbag 22 extends downwardly, i.e., along the vertical axis V, from the trim panel 42, as shown in FIG. 3B. Further, the airbag 22 in the inflated position extends laterally, i.e., along the vehicle-lateral axis A, along the front-end structure 16, e.g., from one side to the other side of the vehicle 10. The airbag 22 may, for example, extend through the trim panel 42, i.e., the tear seam 52, in the inflated position.

The airbag 22 includes the upper portion 24 and a lower portion 62. The upper portion 24 extends upwardly from the trim panel 42, e.g., along the vertical axis V, in the inflated position, and the lower portion 62 extends downwardly from the trim panel 42, e.g., along the vertical axis V, in the inflated position. The lower portion 62 in the inflated position may extend below the bumper 50 relative to the vertical axis V. Additionally, the lower portion 62 may extend laterally along the bumper 50, e.g., from one fender 34 to the other fender 34, in the inflated position. That is, the lower portion 62 may cover the bumper 50 in the inflated position.

The upper portion 24 in the inflated position may extend above the grille assembly 38 relative to the vertical axis V. Additionally, the upper portion 24 may extend laterally along the grille 18, e.g., from one fender 34 to the other fender 34, in the inflated position. That is, the upper portion 24 may cover the grille 18 in the inflated position.

Further, the upper portion 24 may cover the hood 20 in the inflated position. That is, the upper portion 24 may extend along the vehicle-longitudinal axis L from the front-end structure 16 to the cowl 32, i.e., to the front pillars 14, in the inflated position. Additionally, the upper portion 24 may extend laterally across the hood 20 from one fender 34 to the other fender 34 in the inflated position. By covering the hood 20 and the front-end structure 16, the airbag 22 in the inflated position may control kinematics of an object impacting the front of the vehicle 10.

The pyrotechnic actuators 26 may be spaced from each other along the vehicle-lateral axis A. For example, one pyrotechnic actuator 26 may be disposed on one side of the vehicle 10 and the other pyrotechnic actuator 26 may be disposed on the other side of the vehicle 10. The pyrotechnic actuators 26 are spaced from the front-end structure 16 along the vehicle-longitudinal axis L. Specifically, each pyrotechnic actuator 26 may be disposed at one respective front pillar 14. That is, the pyrotechnic actuators 26 are vehicle-rearward of the airbag 22. The pyrotechnic actuators 26 may be fixed relative to the front pillars 14. For example, the pyrotechnic actuators 26 may be fixed directly to the front pillars 14, e.g., with fasteners. As another example, the pyrotechnic actuators 26 may be fixed to the front pillars 14 via one or more intermediate components. The pyrotechnic actuators 26 may, for example, be covered by the cowl 32, as shown in the Figures.

The pyrotechnic actuators 26 may be any suitable type such as, for example, a rotary actuator, in which a pyrotechnic charges rotates a shaft connected to the tether such that the tether wraps around the shaft; a piston linkage, in which an pyrotechnic charge drives a piston attached to a cable; a ball-in-tube linkage, in which an pyrotechnic charge propels a ball or balls over a cogwheel connected to a cable; a mechanical linkage, in which a compressed spring attached to a cable is released, or any other suitable type. As another example, the pyrotechnic actuators 26 may be linear actuators.

As shown in the Figures, each pyrotechnic actuator 26 includes a tether 64 having a first end (not shown) engaged with the pyrotechnic actuator 26, i.e., feeds into the pyrotechnic actuator 26, and a second end (not numbered) attached to the airbag 22, and specifically the upper portion 24. The tethers 64 may be elongated along the vehicle-longitudinal axis L. For example, the tethers 64 may extend along the hood 20 to the upper portion 24 of the airbag 22. When the airbag 22 is uninflated, the tethers 64 may be disposed in an engine compartment. That is, the tethers 64 may be covered by the hood 20 and the front-end structure 16, as shown in FIG. 1. For example, each tether 64 may be routed along various components of the vehicle 10, e.g., the fenders 34, the headlamps 44, etc., from the pyrotechnic actuator 26 to the airbag 22.

The tethers 64 may be releasably connected to the various vehicle components, e.g., via a plurality of releasable fasteners (not shown). When the releasable fasteners are connected to the vehicle component, the tethers 64 may be fixed relative to the vehicle component. When the releasable fasteners are released from the vehicle component, the tethers 64 may move relative to the vehicle component. The releasable fasteners may be designed to release the tethers 64 from the vehicle component when subjected to a force above a threshold magnitude. That is, the releasable fasteners may disconnect from the vehicle component when subjected to a force greater than the force magnitude. The threshold magnitude may be chosen to be greater than forces from, e.g., inadvertent pulling on the tethers 64 by an occupant but be less than forces from the deployment of the airbag 22.

Additionally, or alternatively, the airbag assembly 56 may include one or more guides (not shown), e.g., rings, brackets, etc., disposed between the pyrotechnic actuators 26 and the airbag 22. The guides may, for example, be disposed adjacent to transitions between gaps 36, 46, 48, e.g., a transition between the first gap 36 and the second gap 46 and a transition between the second gap 46 and the third gap 48. The guides may assist in directing the tethers 64 through the gaps 36, 46, 48 during inflation, e.g., to prevent the tethers 64 from binding During inflation of the airbag 22, the airbag 22 may pull each tether 64 through the respective gaps 36, 46, 48 such that the tethers 64 are external to the engine compartment, as shown in FIG. 3A. For example, the force of the inflation may cause the releasable fasteners to disconnect from the various vehicle components, which may assist in guiding the tethers 64 through the respective gaps 36, 46, 48, e.g., without binding. The tethers 64 may be a woven fabric, e.g., woven nylon. The pyrotechnic actuators 26 may be actuated, e.g., in response to detecting a pre-impact, to retract the tethers 64, which pulls the upper portion 24 of the airbag 22 across the hood 20, i.e., to the front pillars 14, as shown in FIG. 3B.

Figure 4:
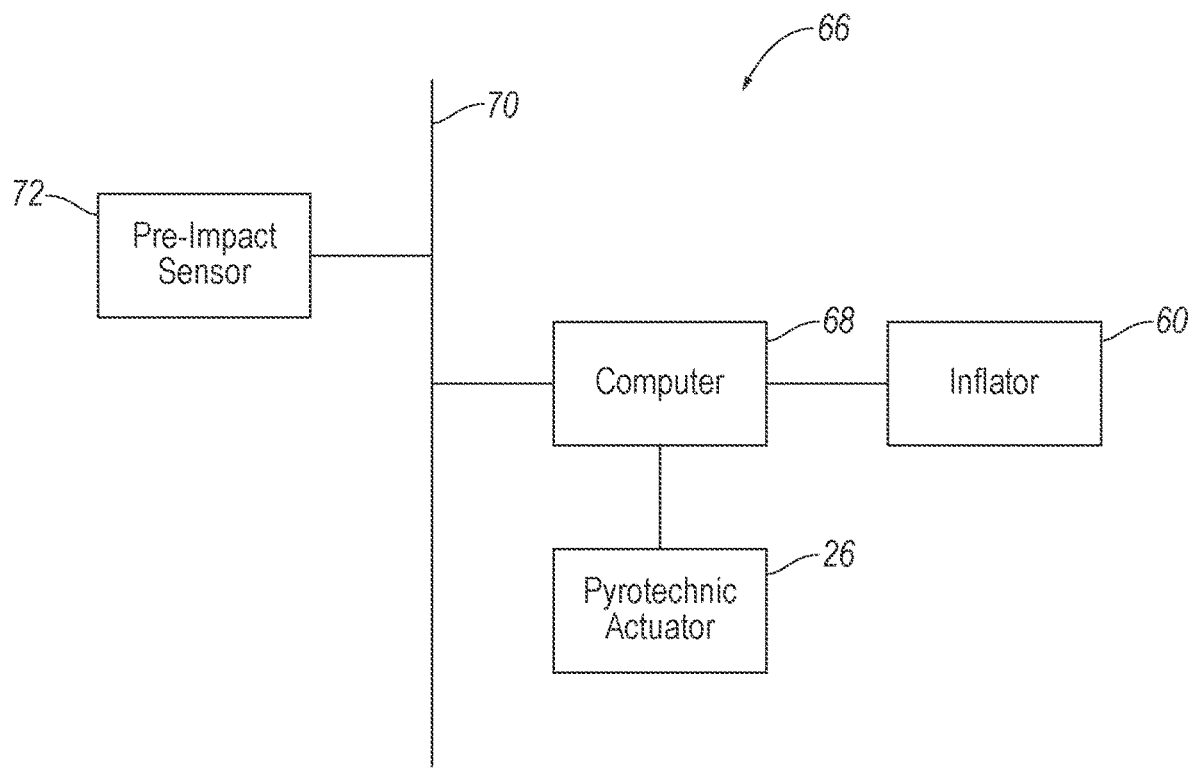
FIG. 4 is a block diagram of a control system for the vehicle.

With reference to FIG. 4, the vehicle 10 may include a control system 66. The control system 66 may include a computer 68, an impact detection sensor 28, the pyrotechnic actuator 26, and the airbag assembly 56, e.g., the inflator 60, in communication through a communication network 70. The computer 68 may be programmed to initiate inflation of the airbag 22 in response to a vehicle pre-impact.

The vehicle 10 may include impact detection sensors 72 programmed to detect the vehicle pre-impact. In other words, the impact detection sensors 72 may be configured to sense impact prior to impact, i.e., pre-impact sensing. The impact detection sensor 72 may be disposed in the vehicle 10. The impact detection sensor 72 may be pre-impact sensors such as radar, lidar, and vision-sensing systems. The vision systems may include one or more cameras, CCD image sensors, CMOS image sensors, etc. When the impact detection sensor 72 sense the vehicle pre-impact occurs, the processor may receive one or more signals from the impact detection sensor 72 indicating the vehicle pre-impact. In response to receiving the signals from the impact detection sensor 72, the processor may initiate the inflation of the airbag 22.

The computer 68 may be a microprocessor-based computing device implemented via circuits, chips, or other electronic components. The computer 68 may include a processor, memory, etc. The memory of the computer 68 may store instructions executable by the processor and the processor may read the instructions from the memory and execute the instructions. The computer 68 may be, for example, a restraint control module (RCM).

The control system 66 may transmit signals through the communications network 70 such as a controller area network (CAN) bus, Ethernet, Local Interconnect Network (LIN), and/or by any other wired or wireless communications network.

The computer 68 may be programmed to actuate the pyrotechnic actuator 26 in response to detecting the vehicle pre-impact. For example, in response to receiving the signals from the impact detection sensor 72, the computer 68 may initiate the actuation of the pyrotechnic actuators 26. In other words, when the impact detection sensor 72 detect a vehicle pre-impact, the computer 68 may send a signal to actuate the pyrotechnic actuators 26. In this situation, the pyrotechnic actuators 26 actuate and retract the tethers 64, which pulls the upper portion 24 of the airbag 22 across the hood 20, i.e., to the front pillars 14.

The computer 68 may be programmed to actuate the inflator 60 prior to the pyrotechnic actuators 26. That is, the computer 68 may send a signal to initiate inflation of the airbag 22 prior to sending a signal to actuate the pyrotechnic actuators 26. The inflator 60 may be actuated prior to the pyrotechnic actuators 26 to pull the tethers 64 through the gaps 36, 46, 48, e.g., via inflation of the airbag 22, prior to the tethers 64 being retracted by the pyrotechnic actuators 26 (see FIG. 3A), which can prevent the tethers 64 from binding during retraction.

Computing devices, such as the computer 68, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 22 is in the uninflated position, under normal operating conditions of the vehicle 10. In the event of a vehicle pre-impact, the impact detection sensor 72 detect the pre-impact. The impact detection sensor 72 transmit a signal indicating the vehicle pre-impact through the communication network 70 to the computer 68. When the vehicle pre-impact is detected, the computer 68 transmits a signal through the communication network 70 triggering the inflator 60 to inflate the airbag 22 with inflation medium from the uninflated position to the inflated position. When the inflator 60 inflates the airbag 22 to the inflated position, the inflation medium flows into the airbag 22, increasing the pressure in the airbag 22. As the pressure is increased in the airbag 22, the airbag 22 extends upwardly and downwardly from the trim panel 42. In this situation, the airbag 22 pulls the tethers 64 through the respective gaps 36, 46, 48. Additionally, the computer 68 transmits a signal through the communication network 70 actuating the pyrotechnic actuators 26. When the pyrotechnic actuators 26 are actuated, the pyrotechnic actuators 26 retract the tethers 64, which pulls the upper portion 24 of the airbag 22 across the hood 20. As the object impacts the vehicle 10, the object may be forced into the airbag 22. When the object impacts the airbag 22, the airbag 22 controls kinematics of the object. Pulling the upper portion 24 across the hood 20 may increase the likelihood that the airbag 22 provides coverage to control the kinematics of the object during the vehicle impact.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A vehicle, comprising:
a body;
the body including a front pillar and a front-end structure spaced from the front pillar, the front-end structure including a grille;
the body including a hood extending from the front pillar to the front-end structure;
an airbag mounted to the front-end structure adjacent to the grille and being inflatable to an inflated position, the airbag including an upper portion inflatable along the front-end structure and the hood to the inflated position; and
a pyrotechnic actuator disposed at the front pillar, the pyrotechnic actuator being positioned to pull the upper portion across the hood towards the front pillar during inflation.

2. The vehicle of claim 1, wherein the pyrotechnic actuator includes a tether extending along the hood to the upper portion of the airbag, the tether being connected to the upper portion.

3. The vehicle of claim 2, wherein the body includes a fender extending alongside the hood between the front-end structure and the front pillar, the tether being disposed between the hood and the fender when the airbag is in an uninflated position.

4. The vehicle of claim 1, wherein the upper portion extends upwardly above the grille in the inflated position.

5. The vehicle of claim 4, wherein the front-end structure includes a bumper disposed below the grille, the airbag including a lower portion extending downwardly below the bumper in the inflated position.

6. The vehicle of claim 5, wherein the airbag is disposed between the grille and the bumper in an uninflated position.

7. The vehicle of claim 5, wherein the front-end structure includes a trim panel disposed between the grille and the bumper, the trim panel covering the airbag in an uninflated position.

8. The vehicle of claim 1, wherein the upper portion extends to the front pillar in the inflated position.

9. The vehicle of claim 1, wherein the upper portion covers the hood in the inflated position.

10. The vehicle of claim 1, further comprising a sensor and a computer in communication with the sensor, the computer having a processor and a memory storing instructions executable by the processor to initiate inflation of the airbag and actuation of the pyrotechnic actuators based on the sensor detecting a pre-impact.

11. The vehicle of claim 10, wherein the instructions further include instructions to initiate the inflation of the airbag prior to actuating the pyrotechnic actuators.

12. An external airbag system, comprising:
a trim panel configured to be disposed adjacent to a grille;
an airbag supported by the trim panel and being inflatable to an inflated position, the airbag including an upper portion configured to inflate along a hood of a vehicle during inflation; and
a pyrotechnic actuator spaced from the trim panel, the pyrotechnic actuator being configured to pull the upper portion across the hood towards a front pillar during the inflation.

13. The external airbag system of claim 12, wherein the upper portion extends upwardly from the trim panel in the inflated position.

14. The external airbag system of claim 12, wherein the airbag includes a lower portion extending downwardly from the trim panel in the inflated position.

15. The external airbag system of claim 12, wherein the trim panel is configured to be disposed below the grille.

16. The external airbag system of claim 12, wherein the upper portion is configured to cover the hood in the inflated position.

17. The external airbag system of claim 12, wherein the upper portion is configured to extend to the front pillar in the inflated position.

18. The external airbag system of claim 12, wherein the pyrotechnic actuator includes a tether configured to extend along the hood to the upper portion of the airbag, the tether being connected to the upper portion.

19. The external airbag system of claim 12, further comprising a sensor and a computer in communication with the sensor, the computer having a processor and a memory storing instructions executable by the processor to initiate the inflation of the airbag and actuation of the pyrotechnic actuators based on the sensor detecting a pre-impact.

20. The external airbag system of claim 19, wherein the instructions further include instructions to initiate the inflation of the airbag prior to actuating the pyrotechnic actuators.

* * * * *